United States Patent [19]
Castellana

[11] Patent Number: 5,368,123
[45] Date of Patent: Nov. 29, 1994

[54] AUTOMOTIVE IMBALANCE SAFETY CUT-OFF SYSTEM

[76] Inventor: Gregory Castellana, 259 Springtown Rd., New Paltz, N.Y. 12561

[21] Appl. No.: 125,777

[22] Filed: Sep. 24, 1993

[51] Int. Cl.$^5$ .............................................. B60K 28/00
[52] U.S. Cl. ..................................... 180/283; 280/688
[58] Field of Search ............... 180/282, 283, 284, 285; 280/688

[56] References Cited

U.S. PATENT DOCUMENTS

| | | | |
|---|---|---|---|
| 3,116,806 | 1/1964 | Rose | 180/283 |
| 3,763,956 | 10/1973 | Ruff | 180/283 |
| 4,195,897 | 4/1980 | Plevjak | 180/283 |
| 4,221,278 | 9/1980 | Ponzo | 180/283 |

*Primary Examiner*—Kenneth R. Rice
*Attorney, Agent, or Firm*—Hugh E. Smith

[57] ABSTRACT

Apparatus for detecting an imbalance of a vehicle comprising, in combination, an upper attachment member removably secured with respect to the upper portion of a shock absorber; a lower attachment member removably secured with respect to the lower portion of a shock absorber; a vertically extending rod fixedly secured with respect to the lower attachment member and slidably secured with respect to the upper attachment member; a roller secured to the upper attachment member with the roller adapted to rotate with respect to the rod during normal reciprocation thereof but to shift with respect to its axis during abnormal extend movement of the rod as caused by an emergency situation; and a switch secured to the upper attachment member in a first electrical state during normal reciprocation of the rod but switched to a second electrical state upon the shifting of the roller in response to abnormal movement of the rod indicative of an abnormal situation for emitting a signal in response thereto.

7 Claims, 4 Drawing Sheets

AUTOMOTIVE IMBALANCE SAFETY CUT-OFF SYSTEM

BACKGROUND OF THE INVENTION

1. Field of the Invention

The present invention relates to an automotive imbalance safety cut-off system and more particularly pertains to sensors for determining when two adjacent wheels of a vehicle detect an imbalance of the automobile as caused by an accident and to inactivate power to the ignition system for safety in response thereto.

2. Description of the Prior Art

The use of vehicle imbalance sensors and devices for cutting off power to automobile engines is well known in the prior art. More specifically, imbalance detectors and ignition cut-off mechanisms heretofore devised and utilized for the purpose of increasing safety during an accident are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,960,145 to Schlotzhauer and 3,915,255 to Springer disclose devices for shutting off the flow of fuel to the engine in the event of an accident. Additional patents for terminating the flow of fuel to the engine of a vehicle include U.S. Pat. Nos. 3,885,112 to Duncan; 4,856,471 to Pettinelli and 4,942,859 to Morikawa. None of the prior art is involved with employing an ignition or fuel cut-off in response to an accident causing adjacent wheels to emit signals through shock absorbers as in the present invention.

In this respect, the automotive imbalance safety cut-off system according to the present invention substantially departs from the conventional concepts and designs of the prior art, and in so doing provides an apparatus primarily developed for the purpose of increasing vehicle safety.

Therefore, it can be appreciated that there exists a continuing need for new and improved systems which can be sense automotive imbalance and to inactivate the vehicle in response thereto. In this regard, the present invention substantially fulfills this need.

SUMMARY OF THE INVENTION

In view of the foregoing disadvantages inherent in the known types of automotive imbalance safety cut-off systems now present in the prior art, the present invention provides an improved mechanical and electrical features wherein the same can be utilized for increasing vehicle safety in the event of an accident. As such, the general purpose of the present invention, which will be described subsequently in greater detail, is to provide a new and improved automotive imbalance safety cut-off system, apparatus and method, which has all the advantages of the prior art and none of the disadvantages.

To attain this, the present invention essentially comprises a system to sense an automotive imbalance and to cut-off the power to the ignition in response thereto for increased safety in the event of an accident comprising, in combination, automotive imbalance sensors positionable adjacent the front wheels and rear wheels of a vehicle, each sensor comprising an upper attachment member attachable to an upper portion of a shock absorber and a lower attachment member attachable to a lower portion of a shock absorber, a vertically extending rod fixedly secured with respect to the lower attachment member and slidably secured with respect the upper attachment member, a roller secured to the upper attachment member with the roller adapted to rotate with respect to the rod during normal reciprocation thereof during driving but to shift laterally with respect to its axis during abnormal extended movement of the rod as caused by an emergency situation, a switch secured to the upper attachment member in a closed orientation during normal reciprocation of the rod but adapted to switch to the closed orientation upon the shifting of the roller in response to an abnormal movement of the rod; a controller to detect when two adjacent wheels, two front wheels, two rear wheels, two left wheels, two right wheels, experience an abnormal condition resulting in abnormally extended movement of their associated rods with detection signals from their associated switches and, in response thereto, generates an emergency signal to energize a power cut-off member to stop the power to the ignition system and cut-off the flow of fuel within the vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automotive imbalance safety cut-off system which has all the advantages of the prior art detectors and cut-off systems and none of the disadvantages.

It is another object of the present invention to provide a new and improved automotive imbalance safety cut-off system which may be easily and efficiently manufactured and marketed.

It is a further object of the present invention to provide a new and improved automotive imbalance cut-off system which is of a durable and reliable construction.

An even further object of the present invention is to provide a new and improved automotive imbalance cut-off system which is susceptible of a low cost of manufacture with regard to both materials and labor, and which accordingly is then susceptible of low prices of sale to the consuming public, thereby making such automotive imbalance cut-off systems economically available to the buying public.

Still yet another object of the present invention is to provide a new and improved automotive imbalance safety cut-off system which provides in the apparatuses and methods of the prior art some of the advantages thereof, while simultaneously overcoming some of the disadvantages normally associated therewith.

Still another object of the present invention is to insure the safety of vehicles in the event of a crash by terminating the flow of fuel and inactivating the engine to minimize the chance of an explosion.

Yet another object of the present invention is to sense when a wheel of a vehicle is in an abnormal orientation as caused by an accident and to generate a signal to the automobile to preclude an explosion.

Even still another object of the present invention is to generate safety signals to an automobile fuel system for preventing explosions, the signals being generated by an abnormal condition of the vehicle as sensed by the shock absorber.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
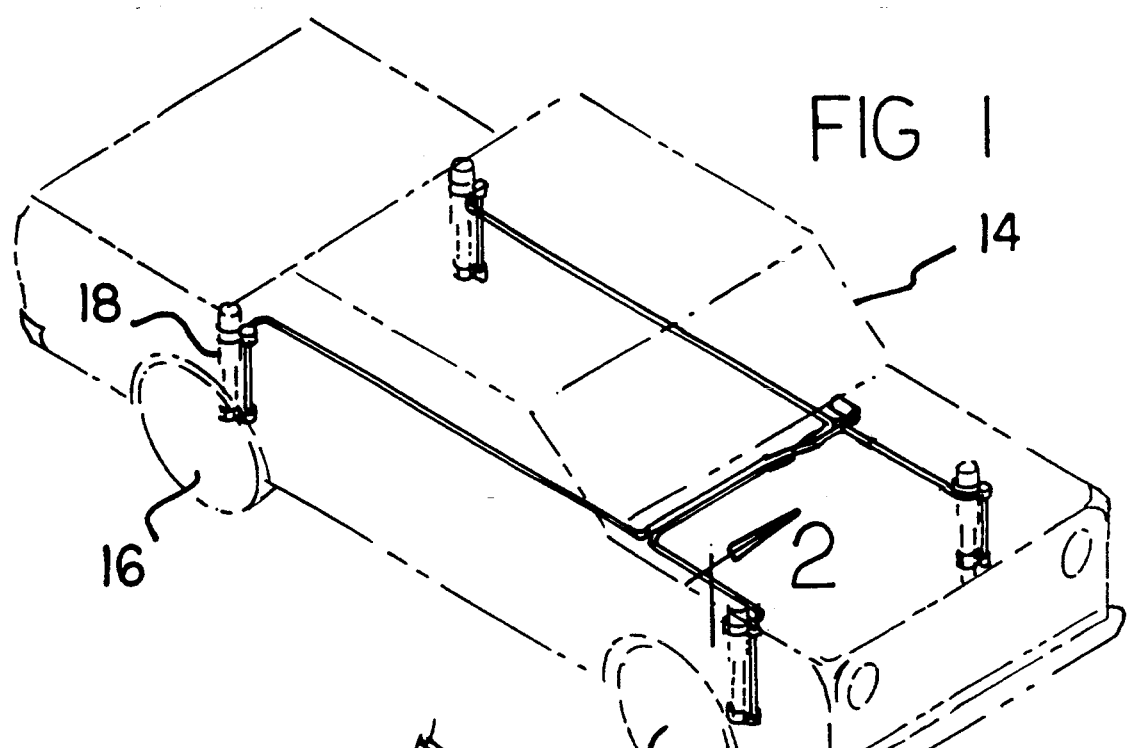
FIG. 1 is a perspective view of an automobile employing the automotive imbalance safety cut-off system of the present invention.
Figure 2:
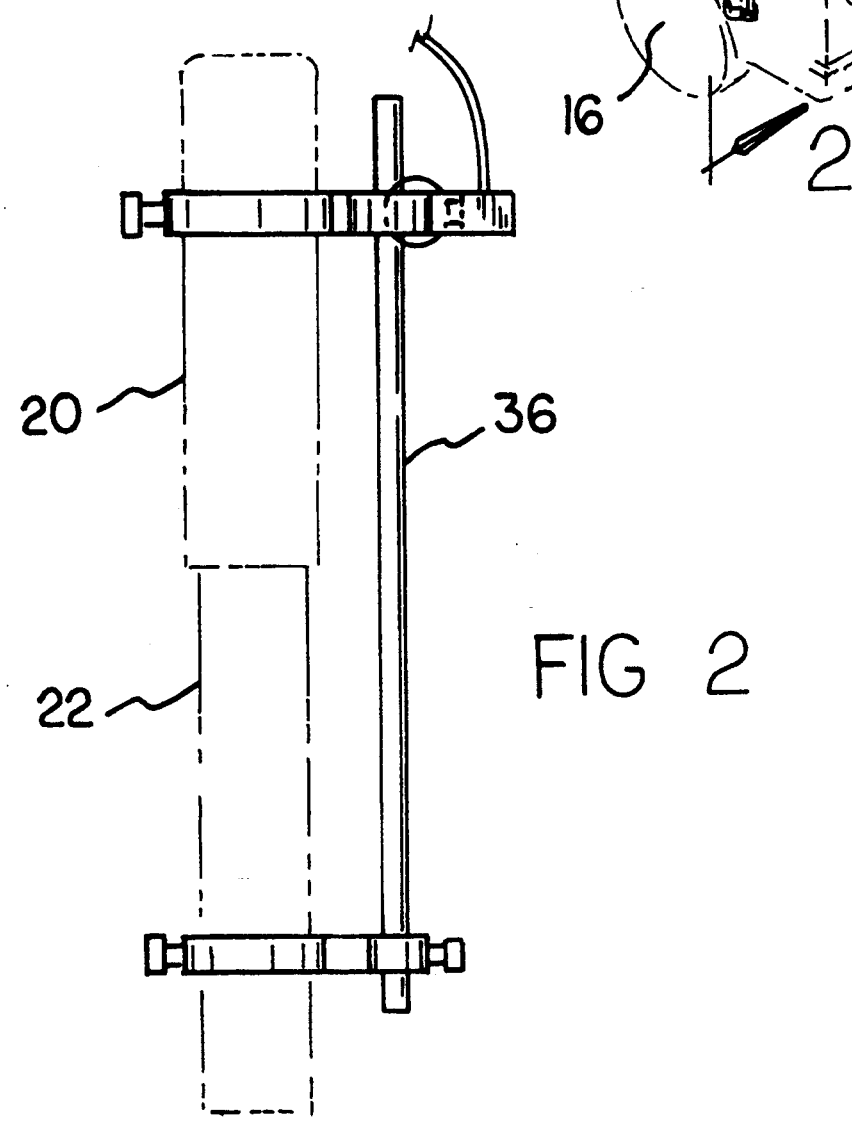
FIG. 2 is an elevational view of the sensors of the system of FIG. 1 with a shock absorber shown in phantom.
Figure 3:
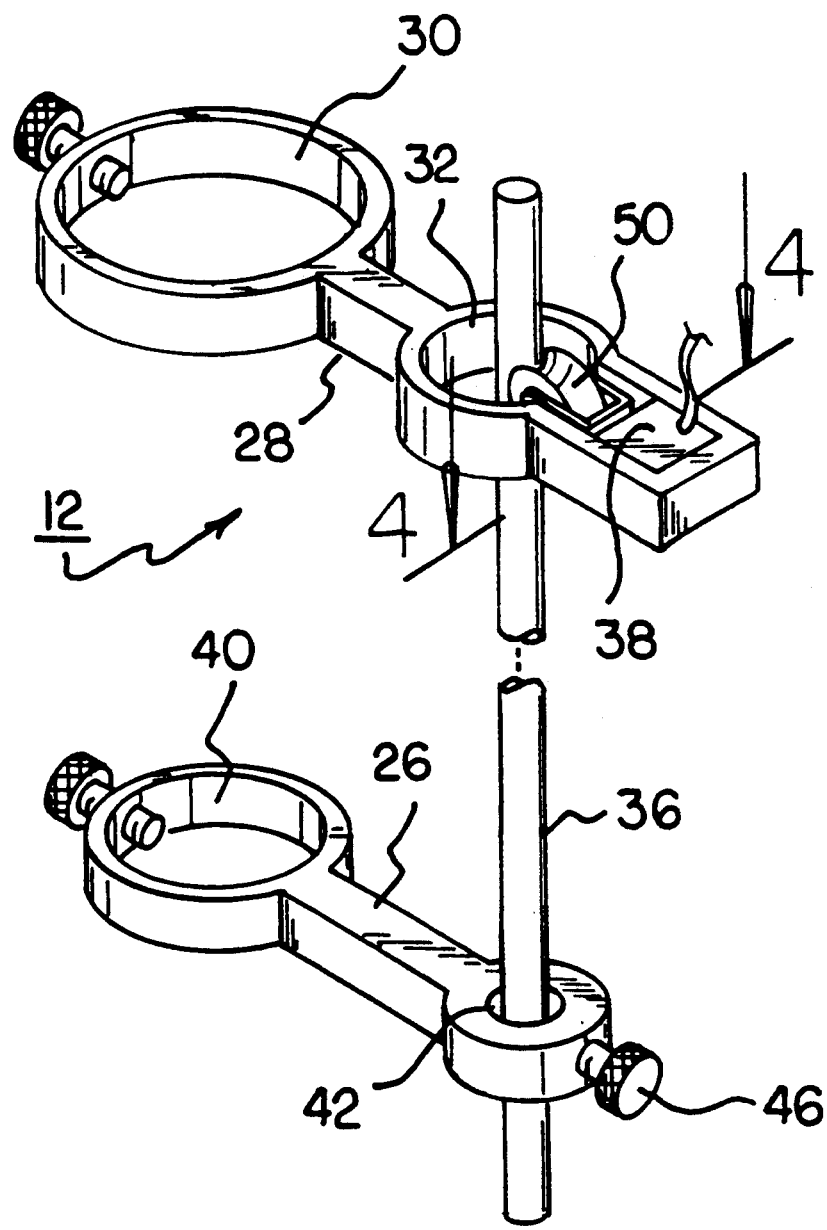
FIG. 3 is an enlarged perspective view of the sensor, of FIG. 2.
Figure 4:
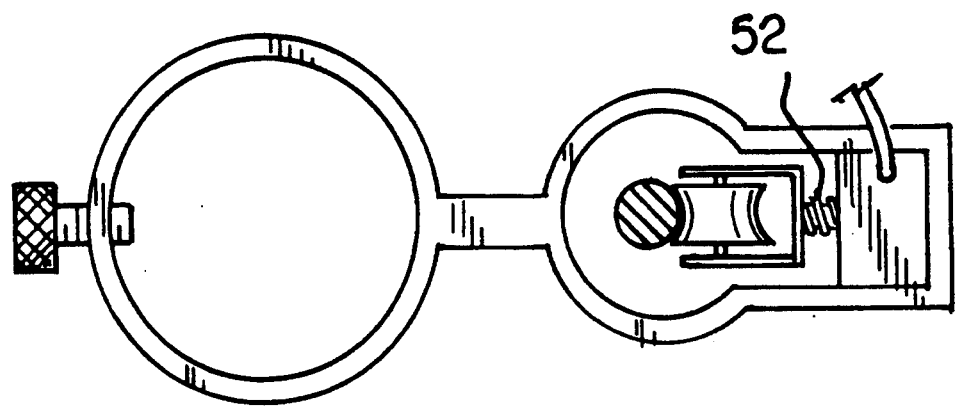
FIG. 4 is a sectional view taken along line 4—4 of FIG. 3.
Figure 5:
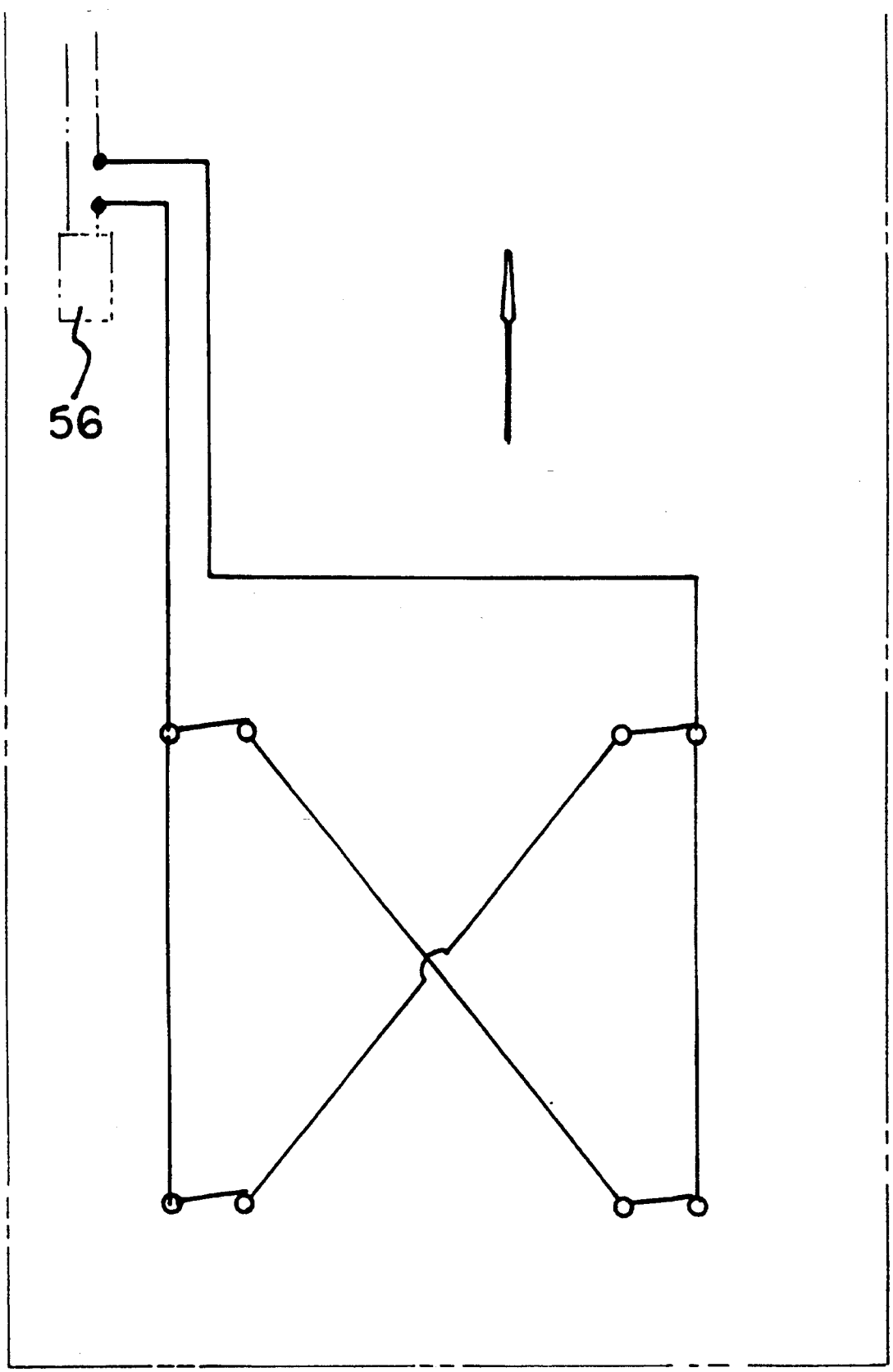
FIG. 5 is an electrical schematic of the system of FIG. 1.

With reference now to the drawings, and in particular to FIG. 1 thereof, a new and improved automotive imbalance safety cut-off system embodying the principles and concepts of the present invention and generally designated by the reference numeral 10 will be described.

More specifically, as can most readily be understood by reference through FIGS. 1 through 5 directed to the primary embodiment of the invention, the system includes a plurality of inter-related components. The system 10 in its general terms is directed to components which sense an automotive imbalance as might occur through an accident or the like wherein adjacent wheels no longer properly support their portion of the weight of the vehicle. In response thereto, the system functions to terminate the flow of fuel to the engine as by inactivating the power to the ignition system. As a result, the vehicle becomes safer in the event of an accident, whereas continued flow of fuel might otherwise cause an explosion.

The central component of the system are the sensors 12 for detecting the imbalance of the vehicle 14. There are a plurality of sensors, preferably four for a four wheeled vehicle. Each sensor is similarly configured and is positioned adjacent to one wheel 16 of the vehicle. Each sensor 12 is coupled to the shock absorber 18 for such wheel. Shock absorbers normally have an upper section 20 and a lower section 22 movable with respect to each other in a resilient relationship to smooth the ride within the vehicle. Each sensor has a lower attachment member or component 26 and an attachment member or upper component 28. Each upper component 28 is formed with a pair of rings 30 and 32, one ring 30 attached to the upper section 20 of the shock absorber for movement therewith and a second ring 32 cooperatively arranged with respect to a rod 36 and switch 38 as will be later described. Similarly, each sensor 12 has a lower component 26 fixedly secured by a ring 40 to the lower section 22 of the shock absorber. A ring 42 at the opposite end functions to physically secure a vertically extending rod 36 with respect to the shock absorber and the upper and lower members of the sensor.

Operatively associated with the upper and lower attachment members of the sensors is a vertically extending rod 36. The rod is fixedly secured with respect to the lower attachment member 26 through a smaller ring 42 and a set screw 46 extending through the ring. The upper end of the rod is slidingly received and the smaller ring 32 of the upper attachment member 28. Also secured with respect to the upper attachment member 28 is a roller 50 secured to the upper attachment member adapted to rotate about an axis perpendicularly located with respect to the axis of the rod 36. During normal reciprocation of any shock absorber and its associated, as caused by movement of the vehicle the rod 36 functions to shift along its axis during normal riding of the vehicle. This is caused by the movement of the reciprocating rod 36 with respect to the roller 50. When, however, the shift in the rod is extensive and the top of the rod falls beneath the roller, a spring 52 will urge the roller into the space within the small ring 32 vacated by the rod. When this occurs, the roller is no longer in physical contact with an associated detector switch 38 mounted on the upper attachment member 28.

This normally closed switch then opens and sends the signal indicative of an emergency situation as caused by the abnormal movement of the rods.

The signal from each or any the switches is transmitted electrically to a controller 56. When two adjacent wheels 16 have sent signals to the controller 56, two adjacent wheels being the two front wheels, the two rear wheels, the two left wheels, or the two right wheels, then the controller 56 determines that an emergency situation exists as a result of the abnormally extended movement of its associated rod and shock absorbers. This condition will cause a detection signal to emanate from the controller in response to the switches. Such emergency signal functions to inactivate the power to the ignition system to cut off the flow of fuel to alleviate any dangerous situation which might otherwise occur through the excess of flow of fuel in an emergency situation.

Figure 6:
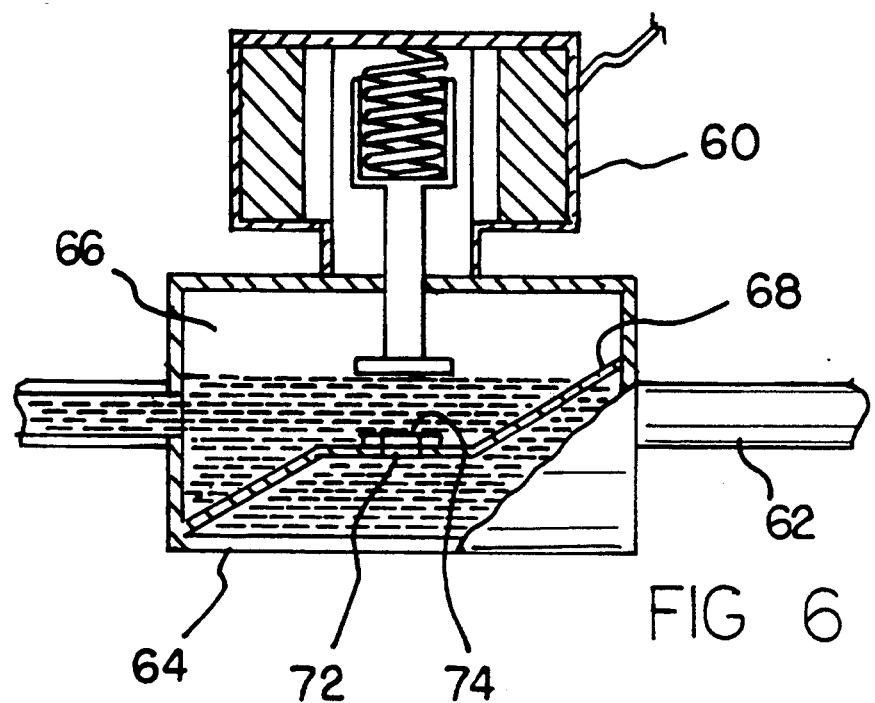
FIG. 6 is a fuel flow cut-off solenoid valve for terminating the flow of fluids to the engine constructed in accordance with an alternate embodiment of the invention.
Figure 7:
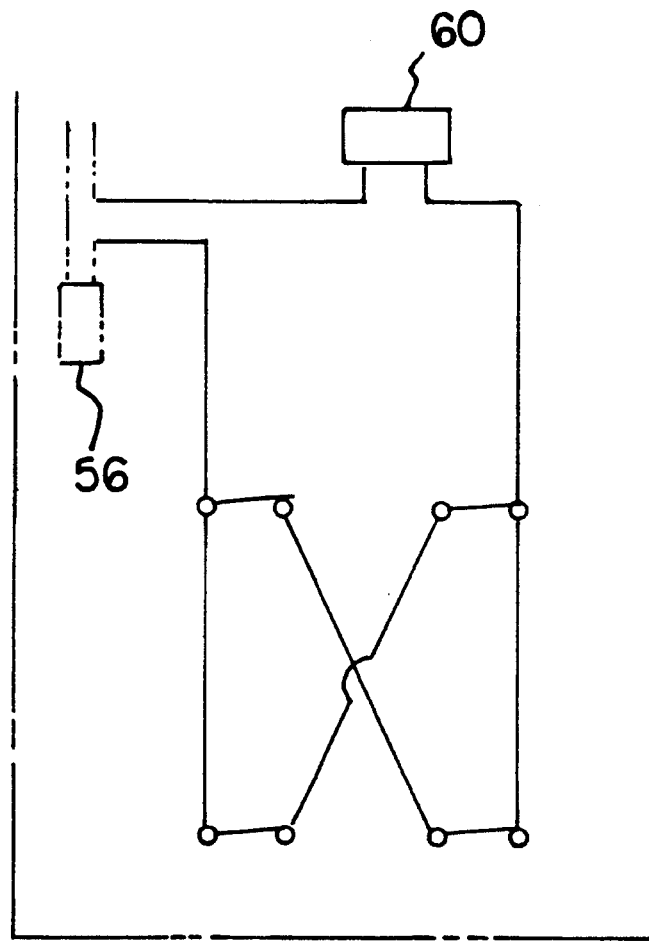
FIG. 7 is a schematic illustration of a system constructed with the alternate embodiment of the invention.

In an alternate embodiment of the invention as shown in FIGS. 6 and 7, the sensors 12 and their associated switches 38 operate in the same fashion with regard to the controller. The controller 56, however, upon detecting two adjacent wheels in an emergency situation will send signals to two areas, the power to the ignition system as well as to control a mechanical solenoid 60 to stop the flow of fuel to the engine by blocking off the line 62 at the fuel filter 64.

The fuel filter 64 is an enclosed chamber 66 in the path of flow of fuel from the gas tank to the engine. It includes an imperforate plate 68 dividing the chamber into an input area and an output area. A plate with an aperture 72 and screen 74 thereover is located in a central extent of the dividing plate 68. When the solenoid 60 receiving the signal from the controller 56 determines the emergency situation, the solenoid 60 drops out and physically closes the line 62 at the fuel filter screen 74 for an immediate termination of fuel to the engine. This acts as a redundant control for stopping the flow of fuel in addition to the termination of power to the ignition system. As such, the safety condition is more than verified.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A system to sense an automotive imbalance and to cut-off the power to the ignition in response thereto for increased safety in the event of an accident comprising, in combination:

automotive imbalance sensors positionable adjacent the front wheels and rear wheels of a vehicle, each sensor comprising an upper attachment member attachable to an upper portion of a shock absorber and a lower attachment member attachable to a lower portion of a shock absorber, a vertically extending rod fixedly secured with respect to the lower attachment member and slidably secured with respect to the upper attachment member, a roller secured to the upper attachment member with the roller adapted to rotate with respect to the rod during normal reciprocation thereof during driving but to shift laterally with respect to its axis during abnormal extended movement of the rod as caused by an emergency situation, a switch secured to the upper attachment member in a closed orientation during normal reciprocation of the rod but adapted to switch to the closed orientation upon the shifting of the roller in response to an abnormal movement of the rod; and a controller to detect when two adjacent wheels, two front wheels, two rear wheels, two left wheels, two right wheels, experience an abnormal condition resulting in abnormally extended movement of their associated rods with detection signals from their associated switches and, in response thereto, generates an emergency signal to energize a power cut-off member to stop the power to the ignition system and cut-off the flow of fuel within the vehicle.

2. Apparatus for detecting an imbalance of a vehicle comprising, in combination:

an upper attachment member removably secured with respect to the upper portion of a shock absorber;

a lower attachment member removably secured with respect to the lower portion of a shock absorber;

a vertically extending rod fixedly secured with respect to the lower attachment member and slidably secured with respect to the upper attachment member;

a roller secured to the upper attachment member with the roller adapted to rotate with respect to the rod during normal reciprocation thereof but to shift with respect to its axis during abnormal extended movement of the rod as caused by an emergency situation; and a switch secured to the upper attachment member in a first electrical state during normal reciprocation of the rod but switched to a second electrical state upon the shifting of the roller in response to abnormal movement of the rod indicative of an abnormal situation for emitting a signal in response thereto.

3. The apparatus as set forth in claim 2 wherein the lower attachment member includes a first ring for attachment to the lower portion of a shock absorber and a second ring for attachment to the lower end of the rod.

4. The apparatus as set forth in claim 3 wherein the upper attachment member includes a first ring for attachment to the upper portion of a shock absorber and a second ring attached to the solenoid and the roller with the roller in rotating contact with an upper portion of the rod during normal driving conditions but shiftable to change the orientation of the switch if the rod lowers abnormally in response to an abnormal driving condition.

5. The apparatus as set forth in claim 2 wherein the emitted signal functions to input a controller for emitting an emergency signal to the vehicle when two adjacent sensors detect an abnormal driving condition.

6. The apparatus as set forth in claim 5 wherein the emergency signal is coupled to the ignition system of an automobile to inactivate the ignition system and terminate the flow of fuel to the engine.

7. The apparatus as set forth in claim 6 and further including a solenoid to close the fuel line to terminate the flow of fuel to the engine.

* * * * *